US009374837B2

(12) United States Patent
Narasimha et al.

(10) Patent No.: US 9,374,837 B2
(45) Date of Patent: Jun. 21, 2016

(54) PREVENTING MISUSE OF RANDOM ACCESS PROCEDURE IN WIRELESS COMMUNICATION SYSTEM

(75) Inventors: Murali Narasimha, Lake Zurich, IL (US); Ravi Kuchibhotla, Gurnee, IL (US); Padmaja Putcha, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 787 days.

(21) Appl. No.: 12/511,873

(22) Filed: Jul. 29, 2009

(65) Prior Publication Data

US 2010/0041370 A1 Feb. 18, 2010

Related U.S. Application Data

(60) Provisional application No. 61/088,230, filed on Aug. 12, 2008.

(51) Int. Cl.
*H04L 9/32* (2006.01)
*H04W 74/08* (2009.01)
*H04W 74/00* (2009.01)
*H04W 88/12* (2009.01)

(52) U.S. Cl.
CPC ........ *H04W 74/008* (2013.01); *H04W 74/0866* (2013.01); *H04W 74/0833* (2013.01); *H04W 88/12* (2013.01)

(58) Field of Classification Search
CPC .......... H04W 74/008; H04W 74/0833; H04W 74/0866; H04W 88/12
USPC .................. 455/450, 464, 509; 380/210, 270
See application file for complete search history.

(56) References Cited

U.S. PATENT DOCUMENTS

| | | | |
|---|---|---|---|
| 6,956,948 B1 * | 10/2005 | Hwang et al. | 380/46 |
| 7,613,244 B2 * | 11/2009 | Hwang et al. | 375/260 |
| 2003/0171120 A1 | 9/2003 | Mustapha | |
| 2004/0214590 A1 * | 10/2004 | Al-Housami et al. | 455/515 |
| 2004/0260950 A1 * | 12/2004 | Ougi et al. | 713/201 |
| 2006/0194578 A1 | 8/2006 | Zhang | |
| 2007/0206531 A1 | 9/2007 | Pajukoski et al. | |

(Continued)

FOREIGN PATENT DOCUMENTS

| | | |
|---|---|---|
| WO | 2007077250 A2 | 7/2007 |
| WO | 2008023932 A1 | 2/2008 |

(Continued)

OTHER PUBLICATIONS

Patent Cooperation Treaty, "PCT Search Report and Written Opinion of the International Searching Authority" for International Application No. PCT/US2009/053388 Feb. 16, 2010, 14 pages.
3GPP TSG-RAN WG1 #18, TSGR1#18(01)0123 "FPACH structure and coding for 1.28 Mcps TDD" LG Electronics Inc., Boston USA, Jan. 15-18, 2001, 6 pages.
Patent Cooperation Treaty, "PCT Search Report and Written Opinion of the International Searching Authority" for International Application No. PCT/US2010/040138 Feb. 9, 2011, 11 pages.

(Continued)

*Primary Examiner* — Kashif Siddiqui
(74) *Attorney, Agent, or Firm* — Lerner, David, Littenberg, Krumholz & Mentlik, LLP

(57) ABSTRACT

A method for preventing misuse of a random access procedure including transmitting a random access preamble, receiving a random access response message which includes a random access response that is scrambled using the identity of the random access preamble transmitted by the mobile station, checking that the random access response is in response to the random access preamble transmitted by the mobile station, and decoding the random access response.

5 Claims, 4 Drawing Sheets

(56) References Cited

U.S. PATENT DOCUMENTS

| | | |
|---|---|---|
| 2007/0206546 A1 | 9/2007 | Alberth, Jr. et al. |
| 2008/0080432 A1* | 4/2008 | Lu et al. ............ 370/335 |
| 2008/0125043 A1 | 5/2008 | Karmanenko et al. |
| 2008/0279294 A1* | 11/2008 | Yang et al. ............ 375/260 |
| 2008/0310396 A1* | 12/2008 | Park et al. ............ 370/350 |
| 2009/0238366 A1* | 9/2009 | Park et al. ............ 380/270 |
| 2010/0039988 A1 | 2/2010 | Narasimha et al. |
| 2010/0093386 A1 | 4/2010 | Damnjanovic et al. |
| 2010/0254340 A1 | 10/2010 | Park et al. |
| 2010/0260140 A1 | 10/2010 | Zhu |
| 2011/0096748 A1 | 4/2011 | Meyer et al. |
| 2011/0170503 A1 | 7/2011 | Chun et al. |

FOREIGN PATENT DOCUMENTS

| | | | |
|---|---|---|---|
| WO | WO 2008/023932 | * | 2/2008 |
| WO | 2009042885 A2 | | 4/2009 |

OTHER PUBLICATIONS

3GPP TS 36.321 V8.6.0 (Jun. 2009), "3rd Generation Partnership Project; Technical Specification Group Radio Access Network; Evolved Universal Terrestrial Radio Access (E-UTRA); Medium Access Control (MAC) protocol specification (Release 8)" pp. 1-47.

Bocan, Valer and Cretu, Vladimir, "Mitigating Denial of Service Threats in GSM Networks" Proceeding of the First International Conference on ARES 2006, Piscataway, NJ, Apr. 20, 2006, 6 pages.

United States Patent and Trademark Office, "Non-Final Rejection" for Application No. 12/511,882 dated Jul. 27, 2011, 6 pages.

3GPP TS36.321 v8.5.0 (2009-03), 3rd Generation Partnership Project; Technical Specification Group Radio Access Network; Evolved Universal Terrestrial Radio Access (E-UTRA) Medium Access Control (MAC) protocol specification (Release 8), Section 5.1.2.

* cited by examiner

US 9,374,837 B2

PREVENTING MISUSE OF RANDOM ACCESS PROCEDURE IN WIRELESS COMMUNICATION SYSTEM

FIELD OF THE DISCLOSURE

The present disclosure relates generally to wireless communications and more particularly to preventing the misuse of the random access procedure by malicious user terminals in wireless communication systems.

BACKGROUND

In the developing $3^{rd}$ Generation Partnership Project (3GPP) Long Term Evolution (LTE) wireless communication protocol, the Random Access Channel (RACH) procedure consists of a UE sending a random access (RA) preamble to the eNB in a RACH occasion and receiving a random access response from the eNB. The RA response includes the RACH preamble used, a Cell-Radio Network Temporary (C-RNTI) assignment, and an uplink (UL) resource assignment. The UE transmits "message 3" on the resource assigned in the RA response. The RA response is addressed on the Physical Downlink Control Channel (PDCCH) to the Random Access-Radio Network Temporary Identifier (RA-RNTI) corresponding to the RACH occasion that was used by the UE to transmit the RA preamble. In the contention based RACH procedure, message 3 can be a Radio Resource Control (RRC) Connection establishment request or an RRC Connection Re-establishment request. Below we show that the RACH procedure has a loophole that a malicious UE can exploit to deny service to other UEs.

The LTE random access procedure according to 3GPP TS 36.321 is illustrated in FIG. 1. In the contention based RA procedure, the UE selects a RA preamble identifier, to transmit to the network, from a set of RA preamble identifiers supported by the eNB. The UE also selects a RA time-frequency resource (physical random access channel) to transmit the RA preamble from a set of available RA time-frequency resources. The UE then transmits the selected RA preamble identifier using the selected RA time-frequency resource (MSG 1). The UE then receives a RA response message (MSG 2), which includes a temporary C-RNTI and an uplink resource assignment (UL grant). The UE then transmits message 3 which includes a unique identifier of the UE. Examples of message 3 include RRC connection establishment request and RRC connection re-establishment request. It is possible that contention occurs during message 3 transmission, i.e., another UE (e.g., UE2) transmitting its message 3 using the UL grant provided in MSG 2 due to UE2 having transmitted the same RA preamble identifier in the same RA time-frequency resource as the UE. If the eNB is able to resolve the contention in favor of the UE, it transmits a message 4 to the UE indicating successful resolution of contention. The RACH procedure is then considered complete.

In the non-contention based RA procedure, the eNB transmits a message (MSG 0) indicating an assigned RA preamble identifier. The UE then selects a RA time-frequency resource (physical random access channel) to transmit the RA preamble, from a set of available RA time-frequency resources. The UE then transmits the assigned RA preamble identifier using the selected RA time-frequency resource (MSG 1). The UE then receives a RA response message (MSG 2), which includes a temporary C-RNTI and an uplink resource assignment (UL grant). The RACH procedure is then considered complete.

FIG. 2 illustrates a known procedure for exploiting a RACH loophole. The malicious UE can simply listen for RA responses (e.g., by searching for valid RA-RNTIs on the PDCCH) and acquire the UL grants. The malicious UE can then use the resource assigned in the UL grant to send a fake message 3. For example, the malicious UE may send an RRC Connection Re-establishment request as message 3 including in it a randomly chosen Message Authentication Code-I (MAC-I), any C-RNTI and Physical Cell Identifier (PCI). The eNB cannot identify the UE requesting the re-establishment; therefore the eNB rejects the RRC connection establishment. The legitimate UE may have started the RACH procedure for an RRC connection re-establishment or an RRC connection establishment. In both cases the legitimate UE's attempt to send message 3 fails and the legitimate UE re-attempts the procedure. The malicious UE repeats the procedure and this leads to a denial of service to the legitimate UE.

Even with the non-contention RACH procedure, a malicious UE can deny service to the legitimate UE. For example, when the legitimate UE performs a RACH for UL synchronization to a target cell during a handover, the malicious UE can capture the RA response and use the resource indicated in the UL grant to send an RRC connection re-establishment request indicating a handover failure. This leads the legitimate UE eventually to a handover failure.

The current LTE MAC specification TS 36.321 lists the structure of the random access response message as illustrated in FIGS. 3-6. It shows that the RA preamble used by a UE is echoed in the MAC sub-header corresponding to the random access response protocol data unit (PDU) intended for the UE. Note that an RA response message can contain multiple RA responses. That is, the RA response message can respond to multiple UEs that send RA preambles in a particular RACH occasion. Also note that the RA response message is addressed to a "RA-RNTI". There is a one to one association between the RA-RNTIs and the RACH occasions in each radio frame.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

The disclosure focuses on constructing the random access response such that only the intended UE can correctly utilize an UL grant included in the response.

Figure 1:
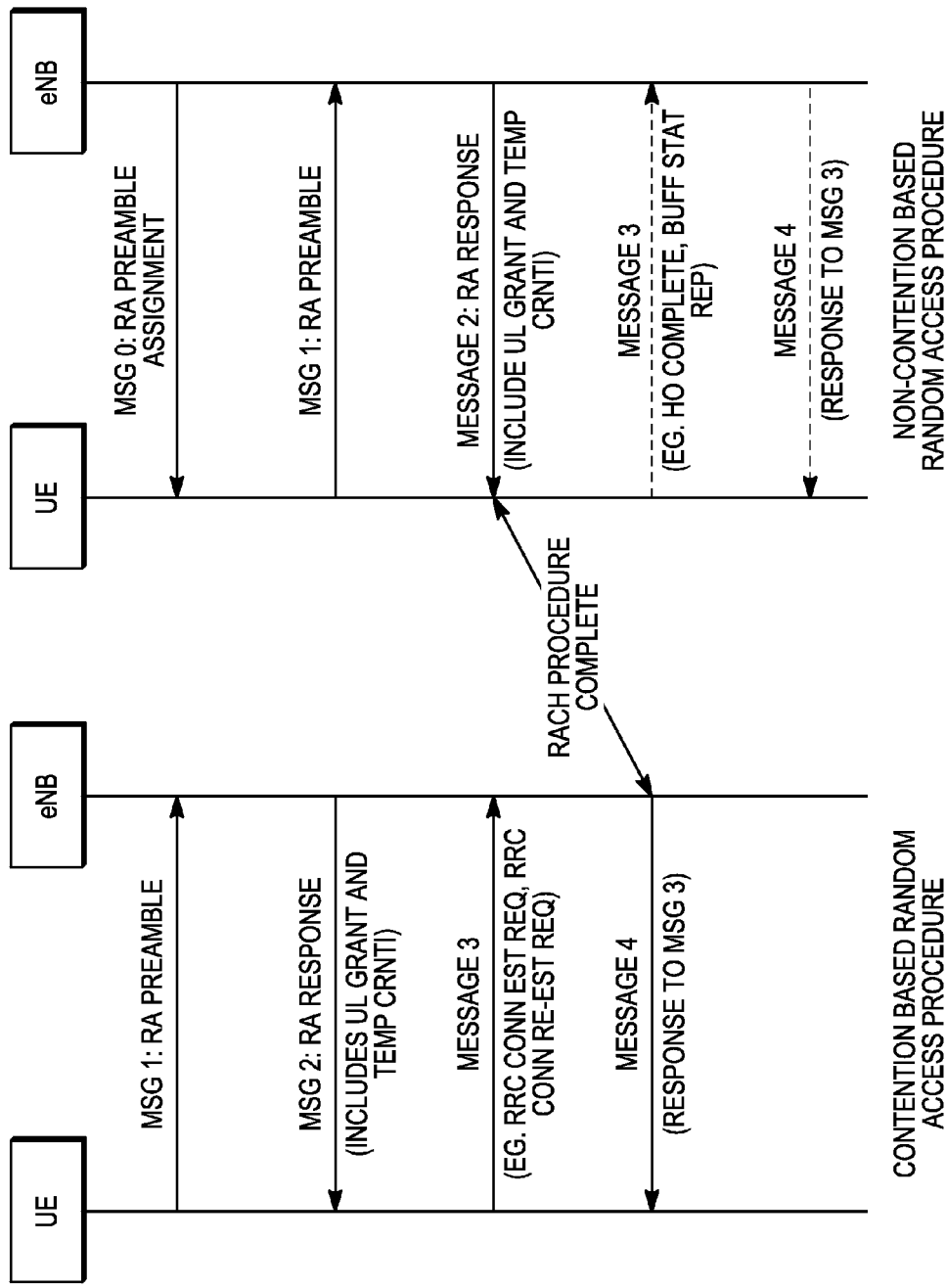
FIG. 1 illustrates a prior art random access procedure.
Figure 2:
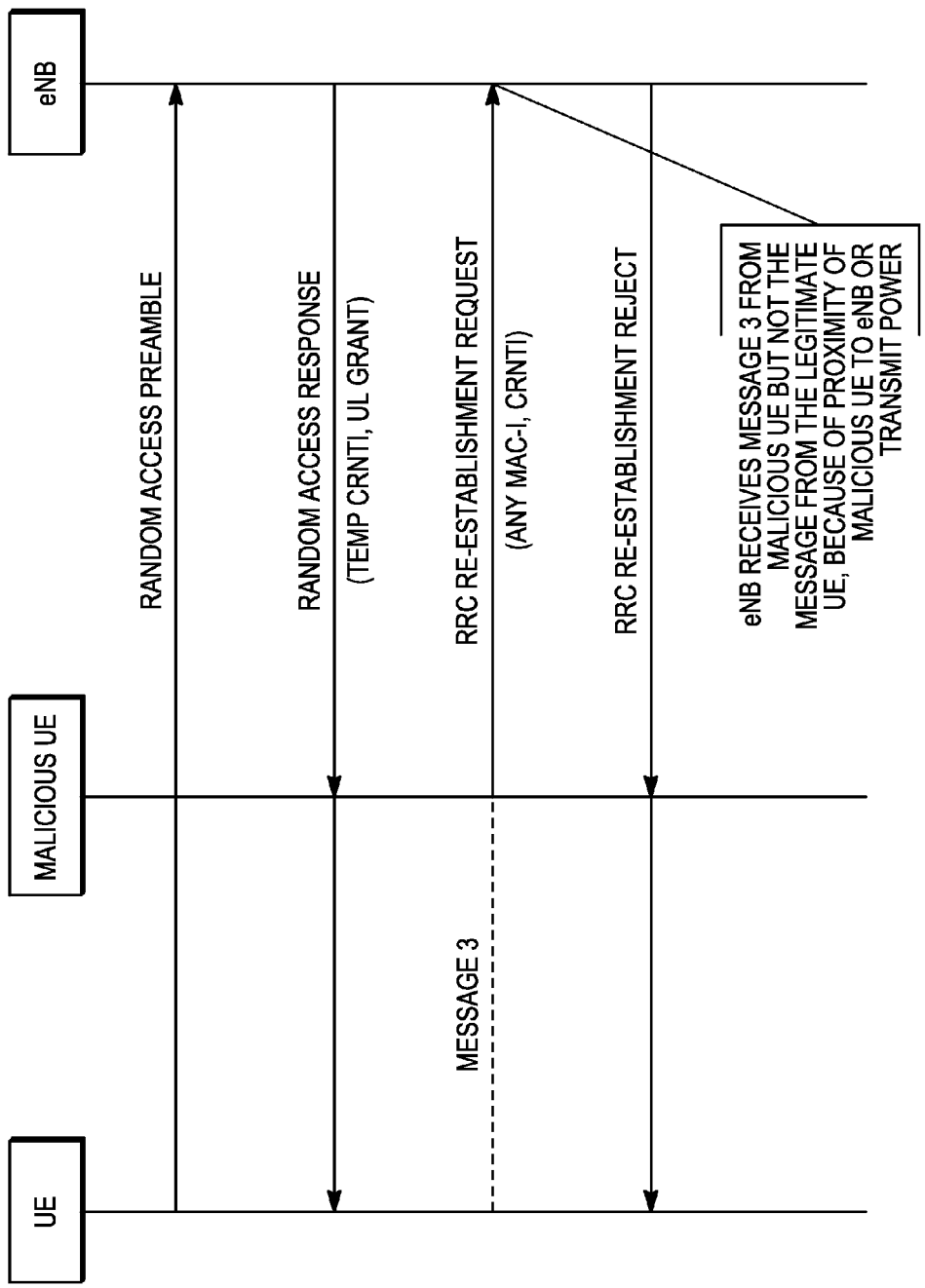
FIG. 2 illustrates a prior art procedure for exploiting a random access procedure loop hole.
Figure 3:
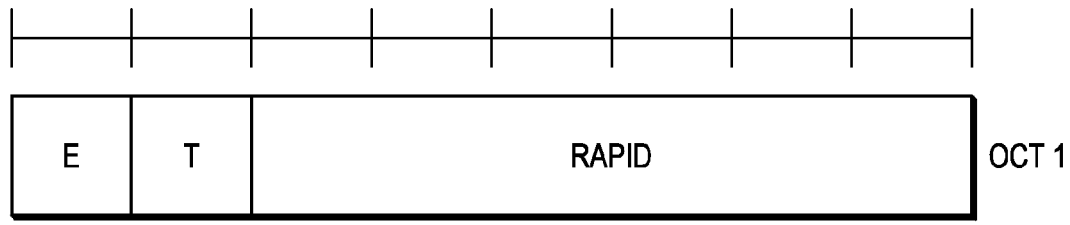
FIG. 3 illustrates an E/T/RAPID MAC sub-header.
Figure 4:
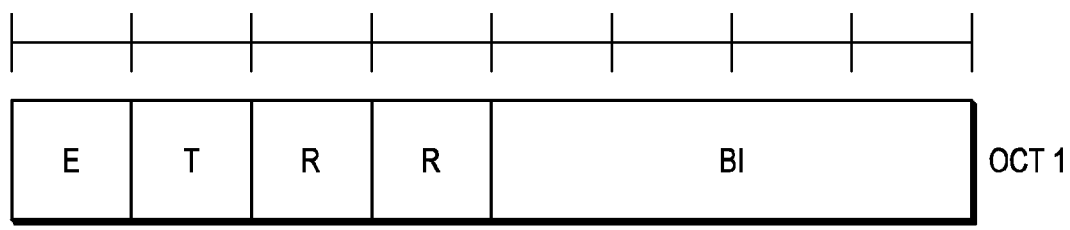
FIG. 4 illustrates an E/T/R/R/BI MAC sub-header.
Figure 5:
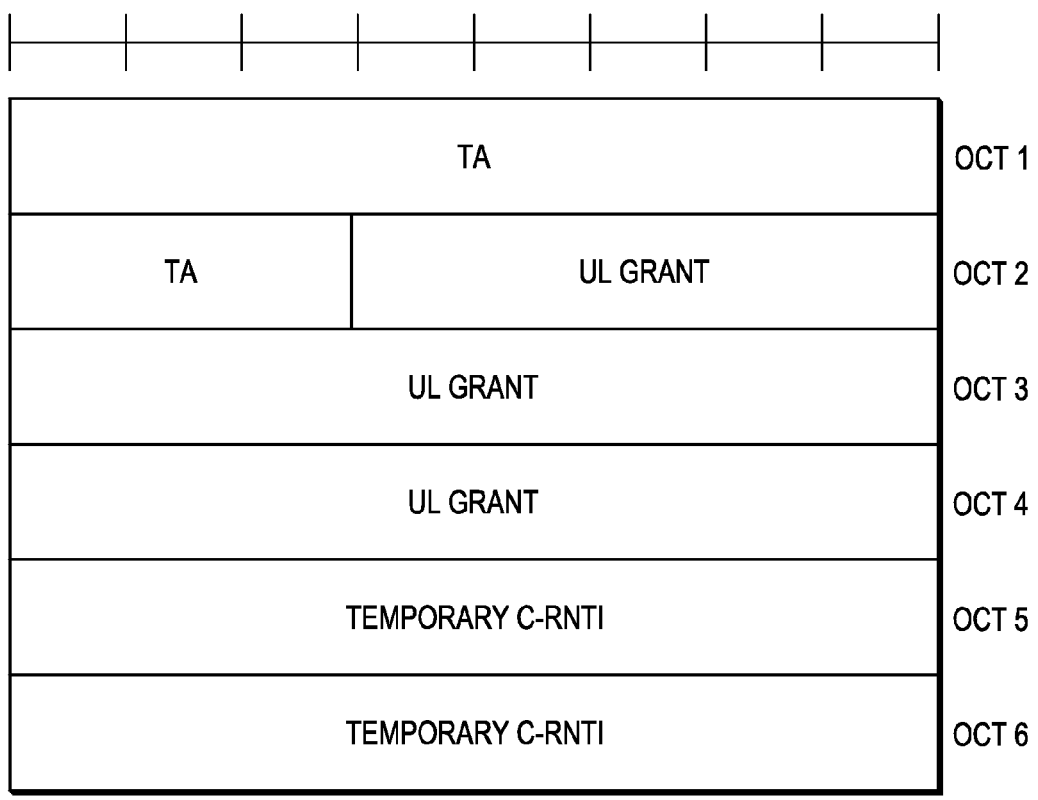
FIG. 5 illustrates a MAC RAR.

In one embodiment of the disclosure, the UL grant is scrambled within the RA response message so that a malicious UE cannot correctly decode it. According to this embodiment, the eNB is configured to: compute a cyclic redundancy check (CRC) over the Medium Access Control (MAC) Random Access Response (RAR) block (shown in FIG. 5), scramble the computed CRC using the received RA preamble, scramble the MAC RAR block using the received RA preamble, and transmit the scrambled MAC RAR block and the scrambled CRC in the RA response message.

A UE that receives the RA response message and the MAC RAR block within it is configured to de-scramble the received MAC RAR block and the corresponding received CRC using the RA preamble it transmitted to obtain RAR-descrambled and CRC-descrambled respectively. The UE also computes the CRC of RAR-descrambled. If the CRC of RAR-descrambled is equal to the CRC-descrambled, then the UE considers or assumes that the RAR to be intended for the UE. Otherwise, the UE assumes that the RAR is intended for a different UE. The RA preamble used by the legitimate UE is not known to the malicious UE. A malicious UE would have to try all of the 64 RA preambles to attempt to successfully decode the message. The CRC can be transmitted in place of the RA preamble ID ("RAPID") in the current PDU structure.

According to a second embodiment of the disclosure, the eNB addresses the RA response message to an RNTI that is offset from the (actual) RA-RNTI by the RA preamble received. Currently after transmitting a RACH preamble, a UE awaits an RA response message addressed to an RA-RNTI, where RA-RNTI is $t\_id+10 \times f\_id$, where $0 \le t\_id<10$ and $0 \le f\_id<6$. The maximum value of the RA-RNTI is 59. Instead of this, UE would await an RA response message addressed to an RNTI $t\_id+10 \times f\_id+(pr \times 64)$, where pr is the RA-preamble received by the eNB. This ensures that the 6 least significant bits of the RNTI are the RA-RNTI and the next 6 least significant bits are the preamble pr.

A UE receives the RA response message by looking for the correct RNTI and a malicious UE is unable to determine the correct RNTI to look for because the malicious UE is not aware of the RA preamble transmitted by the legitimate UE. This solution can be implemented entirely as a change in the MAC specification. It also eliminates the need to echo the RA preamble in the RA response message, thus making the RA response message smaller. Note that currently the MAC specification allows multiple RA responses to be included in a single RA response message. For the second embodiment to be used only one RA response can be included in a RA response message. This latter requirement requires a corresponding change to the MAC specification.

According to another embodiment of the disclosure, the eNB transmits a bit string S which is the result of applying a scrambling function SCR on the RA preamble ID. The intended UE can use this for verification. The eNB assigns a resource R for message 3 transmission by signalling resource R+f(pr) in the UL grant, where pr is the RA preamble transmitted by the UE, and f is a function that maps preambles to discrete numerical offsets. The offsets can be either frequency offsets or time offsets. Note that if frequency offsets are used, f depends on the cell bandwidth.

A UE that receives the RA response message de-scrambles all the scrambled preamble identities (IDs) received and checks to see if the results include the preamble transmitted by the UE. If the preamble ID it transmitted is included, the UE determines the starting resource block for message 3 transmission from the RB R' signalled in the RA response as R'-f(pr).

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A mobile station configured to prevent misuse of a random access procedure, the mobile station comprising:
   a transceiver coupled to a controller,
   the controller configured to cause the transceiver to transmit and receive,
   a random access response received by the mobile station is scrambled using an identity of a random access preamble transmitted by the mobile station;
   the controller further configured to check that the random access response is in response to the random access preamble transmitted by the mobile station and to decode the random access response,
   wherein the controller is configured to check by de-scrambling a verification code to obtain a de-scrambled verification code, wherein the verification code corresponds to the random access response, and by determining that the descrambled verification code is correct,
   wherein the controller is configured to determine that the de-scrambled verification code is correct by de-scrambling the random access response to obtain the descrambled random access response, computing a function of the de-scrambled random access response, and determining that the de-scrambled verification code is equal to the computed function of the de-scrambled random access response, and
   wherein the random access response is descrambled to obtain the descrambled random access response by applying an exclusive-or operation between a bit sequence representing the random access response and a bit sequence constructed by repeated concatenation of a bit sequence representing the identity of the random access preamble.

2. A mobile station configured to prevent misuse of a random access procedure, the mobile station comprising:
   a transceiver coupled to a controller,
   the controller configured to cause the transceiver to transmit and receive,
   a random access response received by the mobile station is scrambled using an identity of a random access preamble transmitted by the mobile station;
   the controller further configured to check that the random access response is in response to the random access preamble transmitted by the mobile station and to decode the random access response,
   wherein the controller is configured to check by de-scrambling a verification code to obtain a de-scrambled verification code, wherein the verification code corresponds to the random access response, and by determining that the descrambled verification code is correct, and
   wherein the verification code is de-scrambled to obtain the de-scrambled verification code by applying an exclusive-or operation between the verification code and the identity of the random access preamble.

3. A mobile station configured to prevent misuse of a random access procedure, the mobile station comprising:
   a transceiver coupled to a controller,
   the controller configured to cause the transceiver to transmit and receive,
   a random access response received by the mobile station is scrambled using an identity of a random access preamble transmitted by the mobile station;
   the controller further configured to check that the random access response is in response to the random access preamble transmitted by the mobile station and to decode the random access response, wherein the random access response includes at least one scrambled random access preamble identity, wherein the random access response message includes at least one resource allocation grant corresponding to the at least one scrambled random access preamble identity, wherein the controller is configured to determine a resource to use for transmission of a message by applying an offset to the resource allocation grant, and wherein the offset is derived from the identity of the random access preamble transmitted by the mobile station.

4. A base station configured to prevent misuse of a random access procedure, comprising:

a transceiver coupled to a controller, the controller configured to construct a random access response in response to a random access preamble received by the transceiver;

the controller configured to scramble the random access response using an identity of the random access preamble before transmitting, from the base station, a random access response message that includes the scrambled random access response, wherein the random access response message further includes a verification code corresponding to the random access response, wherein the verification code is obtained by scrambling a result of computing a function of the random access response using the identity of the received random access preamble, and wherein the scrambling is an exclusive-or operation between the result of computing the function of the random access response and the identity of the received random access preamble.

5. A base station configured to prevent misuse of a random access procedure, comprising:

a transceiver coupled to a controller, the controller configured to construct a random access response in response to a random access preamble received by the transceiver;

the controller configured to scramble the random access response using an identity of the random access preamble before transmitting, from the base station, a random access response message that includes the scrambled random access response, wherein the scrambling is an exclusive-or operation between the random access response and a bit sequence obtained by repeated concatenation of the bit sequence representing the identity of the received random access preamble.

* * * * *